United States Patent
Huang et al.

(10) Patent No.: US 9,696,759 B2
(45) Date of Patent: Jul. 4, 2017

(54) ELECTRONIC DEVICE

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chen-Hsing Huang, Hsinchu (TW); Ying-Hung Tsai, Hsinchu (TW)

(73) Assignees: INTERFACE OPTOELECTRONIC (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 210 days.

(21) Appl. No.: 14/555,701

(22) Filed: Nov. 28, 2014

(65) Prior Publication Data
US 2016/0147260 A1    May 26, 2016

(30) Foreign Application Priority Data
Nov. 21, 2014 (CN) .......................... 2014 1 0668630

(51) Int. Cl.
*G06F 1/16* (2006.01)
*H05K 5/02* (2006.01)
*H04M 1/02* (2006.01)

(52) U.S. Cl.
CPC ........ *G06F 1/1637* (2013.01); *H04M 1/0266* (2013.01); *H05K 5/02* (2013.01)

(58) Field of Classification Search
CPC ...... G06F 1/1637; G06F 1/169; G06F 1/1692; Y10T 428/24331

USPC ........ 428/131, 134, 136, 188; 156/291, 292, 156/314

See application file for complete search history.

(56) References Cited

U.S. PATENT DOCUMENTS

| | | | |
|---|---|---|---|
| 2009/0135150 A1* | 5/2009 | Takashima | G06F 3/041 345/173 |
| 2010/0066938 A1* | 3/2010 | Lee | G02B 6/0088 349/58 |
| 2014/0036458 A1* | 2/2014 | Sato | H05K 7/02 361/749 |
| 2014/0320746 A1* | 10/2014 | Sato | H04N 5/64 348/725 |
| 2015/0253495 A1* | 9/2015 | Matsumoto | G06F 3/044 345/174 |
| 2015/0261033 A1* | 9/2015 | Shin | H05K 5/0086 349/58 |

(Continued)

*Primary Examiner* — Hoa C Nguyen
*Assistant Examiner* — Keith Depew
(74) *Attorney, Agent, or Firm* — Steven Reiss (57) ABSTRACT

The present disclosure provides an electronic device. The electronic device includes a fixing structure, a display module, a cover glass, a first adhesive, and a second adhesive. The fixing structure includes a receiving portion and a fixing portion around the receiving portion. The display module is received in the receiving portion. The cover glass is located above the fixing portion and the display module. The first adhesive is located between the fixing portion and the cover glass to adhere the fixing portion with the cover glass. A groove is defined in the first adhesive. A hole is defined in the fixing portion corresponding to the groove. The second adhesive is injected in the groove via the hole to adhere the fixing portion with the cover glass.

19 Claims, 8 Drawing Sheets

(56) References Cited

U.S. PATENT DOCUMENTS

| | | | |
|---|---|---|---|
| 2016/0109906 A1* | 4/2016 | Trutna | G02F 1/133308 |
| | | | 361/747 |
| 2016/0156755 A1* | 6/2016 | Choi | H04M 1/0266 |
| | | | 455/575.1 |
| 2016/0202726 A1* | 7/2016 | Seen | G02B 6/0051 |
| | | | 349/42 |

* cited by examiner

ELECTRONIC DEVICE

FIELD

The subject matter herein generally relates to an electronic device.

BACKGROUND

An electronic device, such as a mobile phone or a tablet personal computer, includes a cover glass, a display module, and a fixing structure fixing the cover glass and the display module. For increasing a structural strength of the fixing structure, a structural adhesive is injected in the electronic device. However, an amount of the structural adhesive is not easy to control, and then an excessive adhesive phenomenon is existed.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 1:
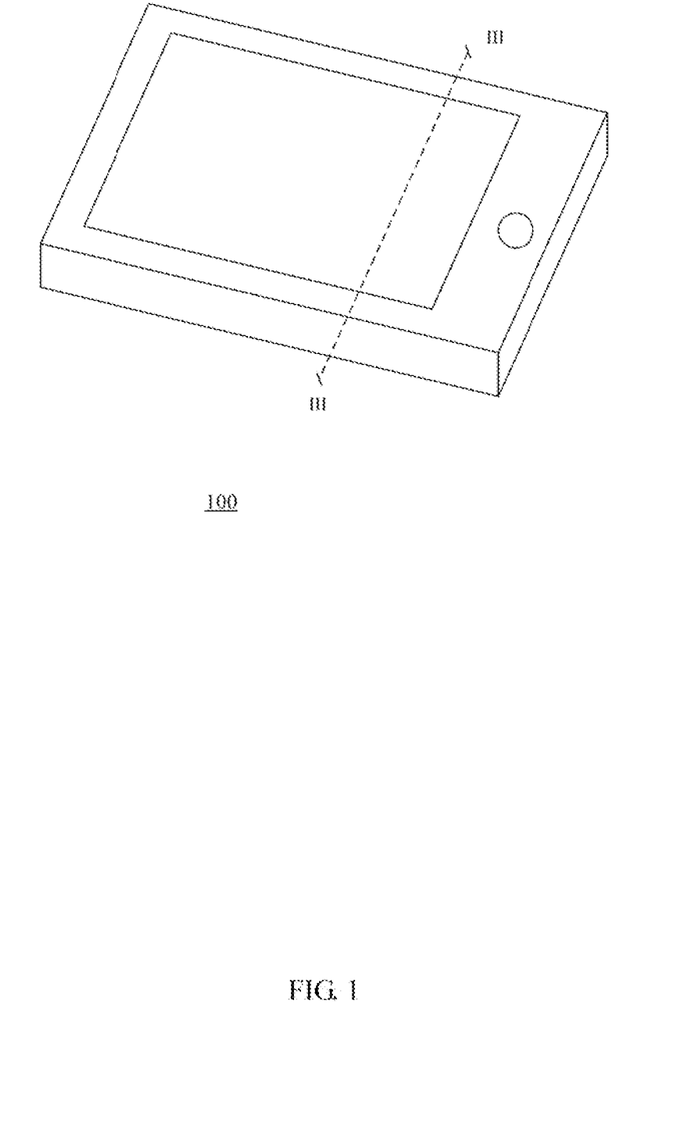
FIG. 1 is a schematic view of an electronic device of a first embodiment.

FIG. 1 is a schematic view of an electronic device 100 of a first embodiment. In this embodiment, the electronic device 100 can be a mobile phone, a tablet personal computer, or other electronic devices.

Figure 2:
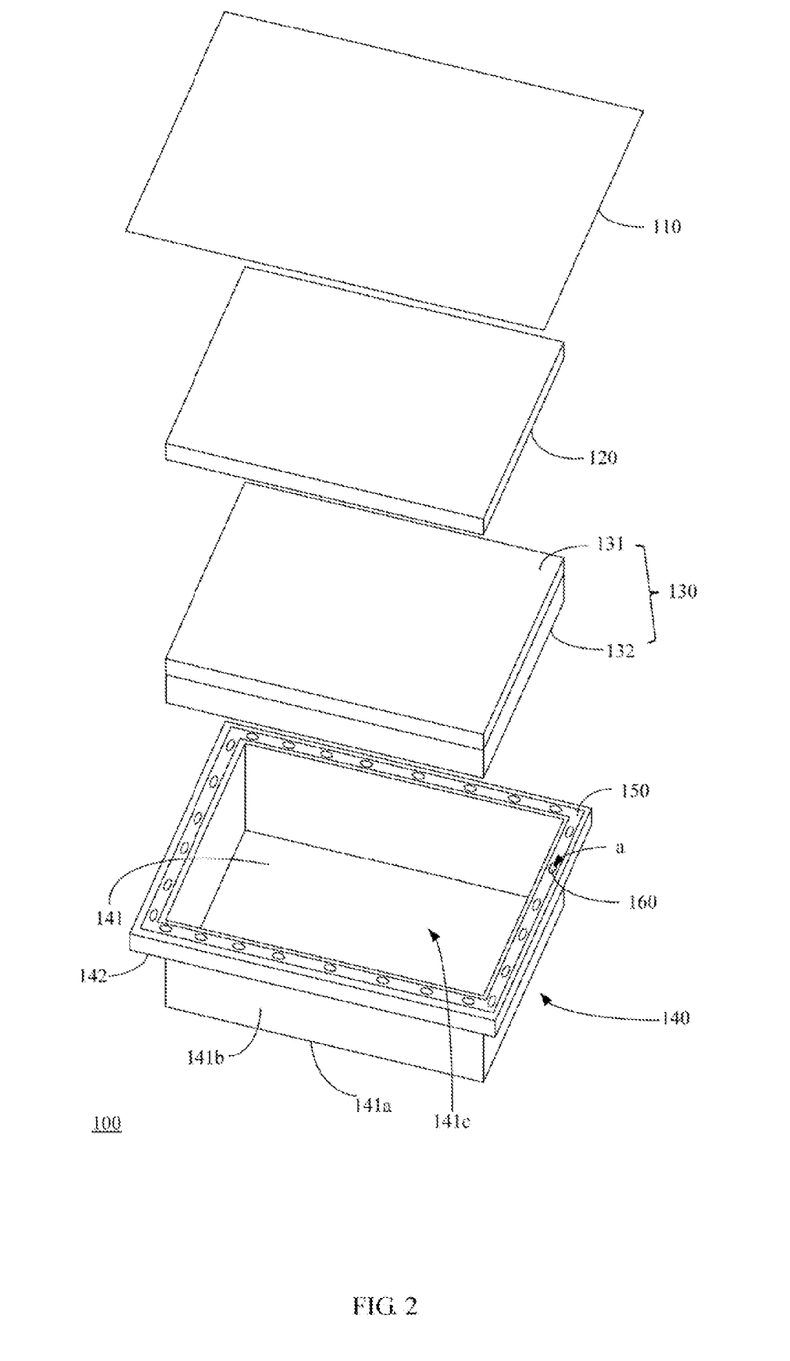
FIG. 2 is an exploded view of the electronic device of FIG. 1.

Referring to FIG. 2, the electronic device 100 includes a cover glass 110, a touch module 120, a display module 130, a fixing structure 140, an adhesive 150, and a structural adhesive 160.

Figure 3:
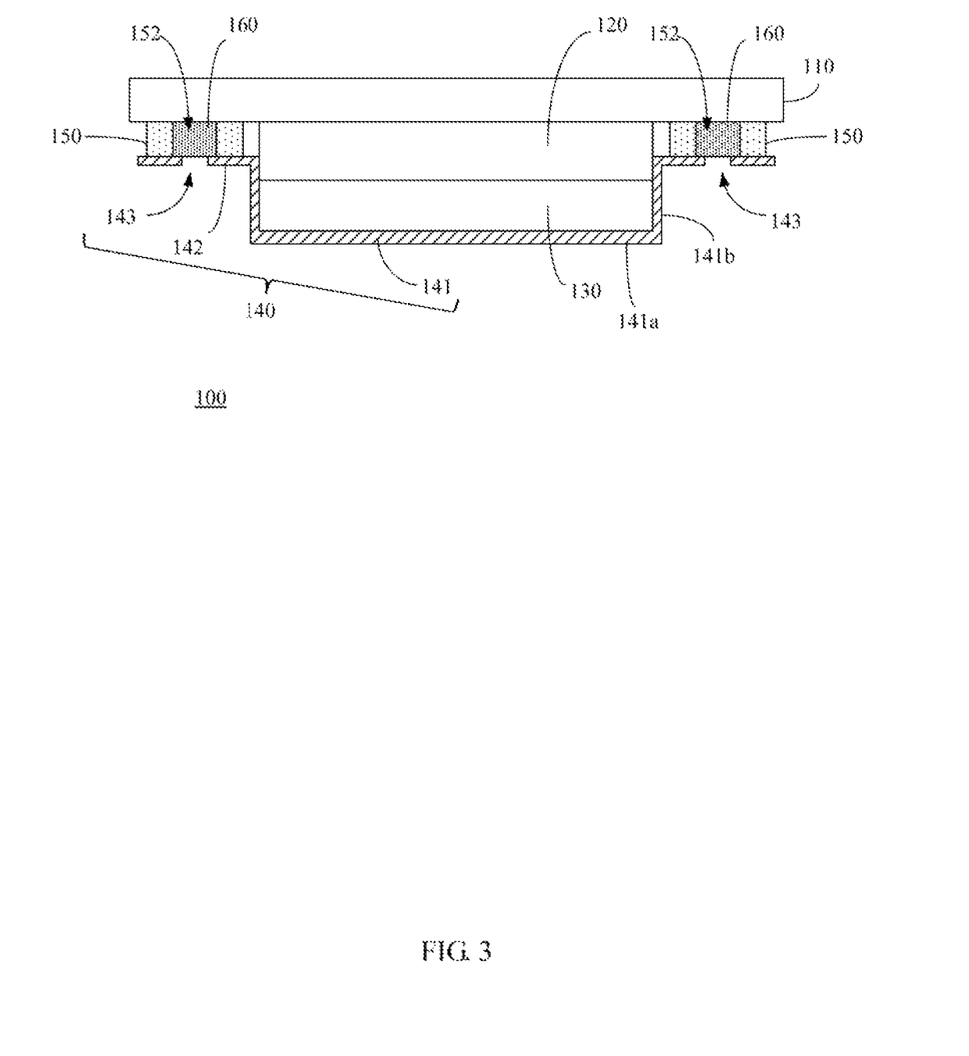
FIG. 3 is a cross-sectional view of the electronic device of FIG. 1, taken along line III-III.

Referring to FIGS. 2 and 3, the fixing structure 140 includes a receiving portion 141 and a fixing portion 142 around the receiving portion 141. The receiving portion 141 includes a bottom plate 141a and four side walls 141b perpendicularly extending from four sides of the bottom plate 141a. The bottom plate 141a and four side walls 141b form a receiving area 141c to receive the touch module 120 and the display module 130. The fixing portion 142 is extended from the ends of the side walls 141b, parallel with the bottom plate 141a and away from the receiving portion 141.

The cover glass 110 is located above the fixing portion 142, the touch module 120, and the display module 130. The touch module 120 is located between the display module 130 and the cover glass 110. The adhesive 150 is located between the fixing portion 142 and the cover glass 110 to adhere the fixing portion 142 with the cover glass 110.

A number of grooves 152 are defined in the adhesive 150. A number of holes 143 are defined in the fixing portion 142 corresponding to the grooves 152. The structural adhesive 160 is injected in the grooves 152 via the holes 143 to increase a structural strength of the fixing structure 140. Preferably, the holes 143 are circular holes. A cross section area in a plane parallel to the cover glass 110 of each of the holes 143 is less than that of the corresponding groove 152.

The cover glass 110 protects the touch module 120, the display module 130, and other electronic elements of the electronic device 100. The touch module 120 is applied for detecting touch operations on the cover glass 110. The display module 130 is applied for displaying images. The fixing structure 140 is applied for fixing the cover glass 110, the touch module 120, and the display module 130. The adhesive 150 is applied for adhering the cover glass 110 with the fixing structure 140. The structural adhesive 160 is applied for increasing a structural strength of the fixing structure 140.

In this embodiment, the cover glass 110 is made of glass. The touch module 120 is a capacitive touch panel. The display module 130 is a liquid crystal display including a display panel 131 and a backlight 132. The fixing structure 140 is made of metal. The structural adhesive 160 is a DP-810 model or DP-4XL model structural adhesive made by 3M™ Company. It is understood that, in other embodiments, the cover glass 110 can be made of polymer. The touch module 120 can be a resistance type, an infrared type, or an acoustic wave type touch module. The display module 130 can be an OLED (Organic Light Emitting Diode) display panel. The fixing structure 140 can be made of plastics.

Figure 4:
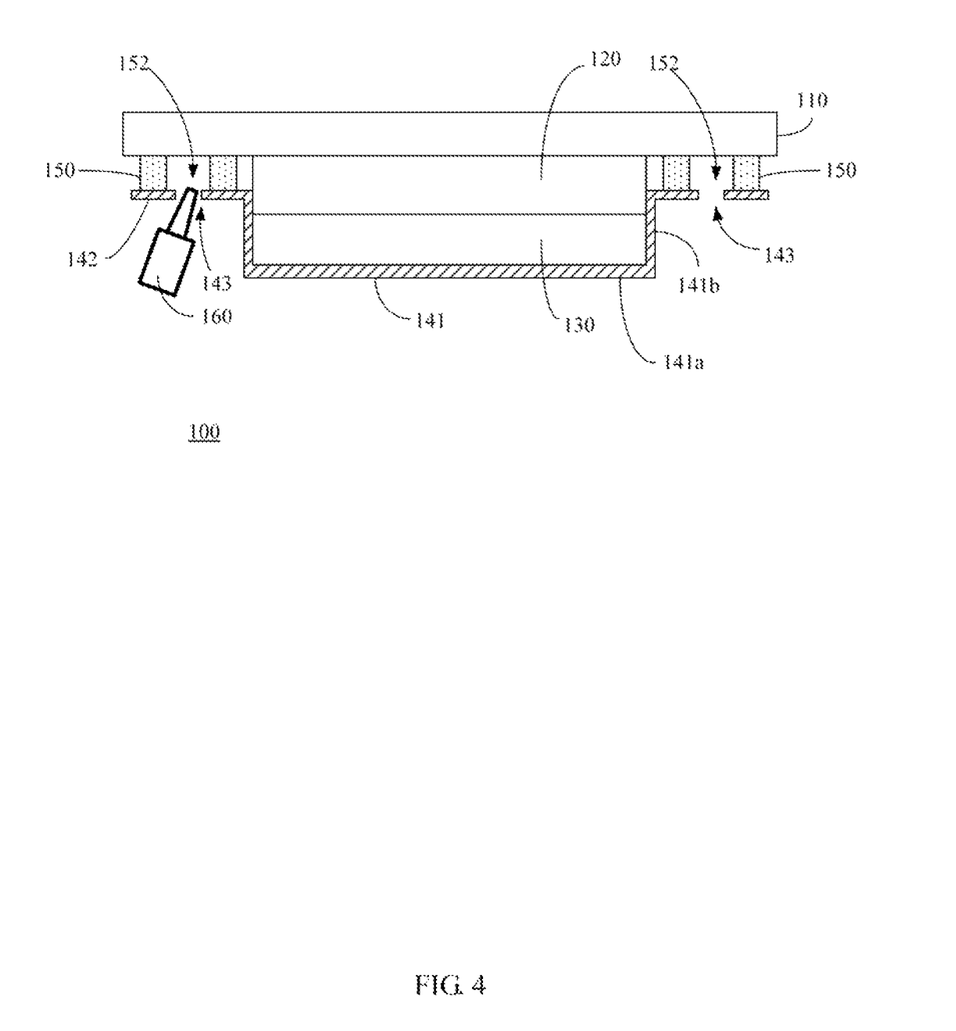
FIG. 4 is a schematic view while a structural adhesive is injecting in the electronic device in FIG. 1.

Referring to FIG. 4, when the electronic device 100 is packaging, the cover glass 110, the touch module 120, and the display module 130 are stuck together firstly, and then the fixing structure 140 is adhered to the cover glass 110 via the adhesive 150. After the fixing structure 140 has been adhered to the cover glass 110, the structural adhesive 160 is injected in the grooves 152 via the holes 143. Then, all sides of the structural adhesive 160 are around and obstructed by the adhesive 150, and thus without excessive adhesive phenomenon.

It is understood that, in an actual product of the electronic device 100, an amount of the structural adhesive 160 is controlled by adjusting a thickness of the adhesive 150 and a size of the groove 152. In this embodiment, the receiving portion 141 and the fixing portion 142 of the fixing structure 140 are integrated molded. In other embodiment, the receiving portion 141 and the fixing portion 142 of the fixing structure 140 are connected with each other by locking or adhering.

Figure 5:
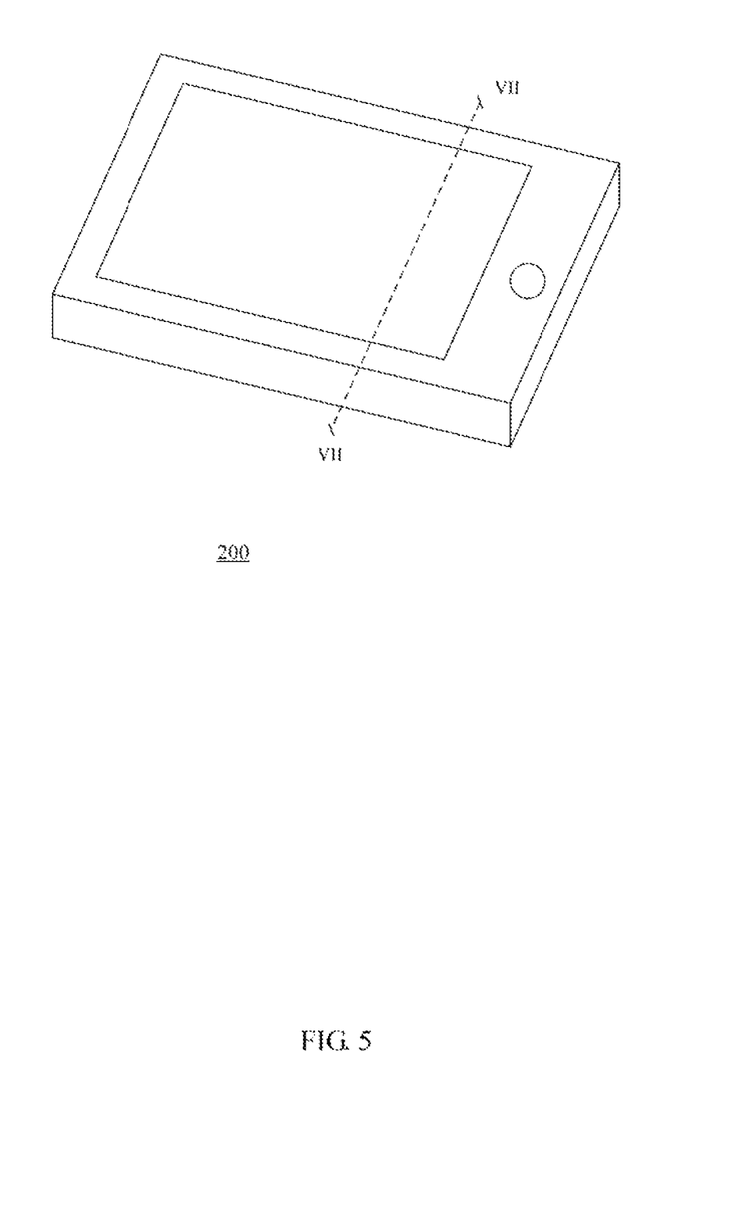
FIG. 5 is a schematic view of an electronic device of a second embodiment.

FIG. 5 is a schematic diagram of an electronic device 200 of a second embodiment. In this embodiment, the electronic device 200 can be a mobile phone, a tablet personal computer, or other electronic devices.

Figure 6:
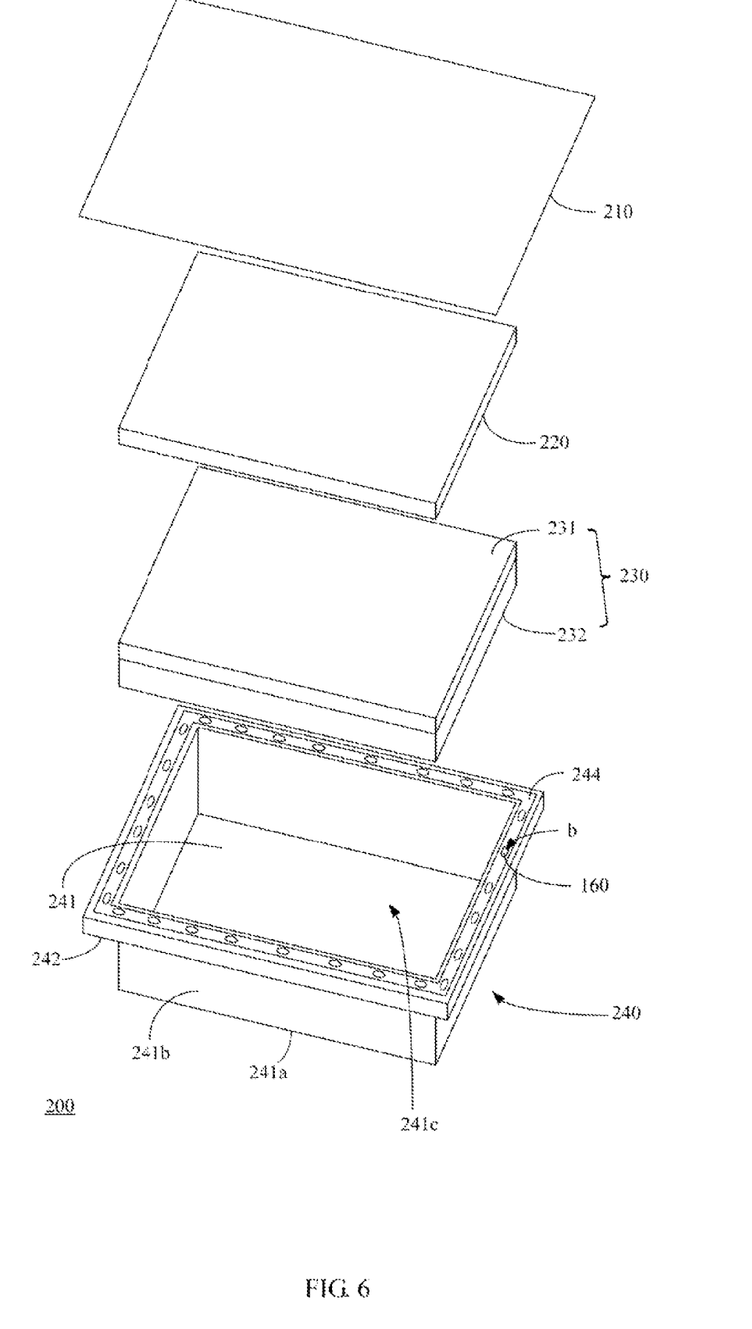
FIG. 6 is an exploded view of the electronic device of FIG. 5.

Referring to FIG. 6, the electronic device 200 includes a cover glass 210, a touch module 220, a display module 230, a fixing structure 240, and a structural adhesive 260.

Figure 7:
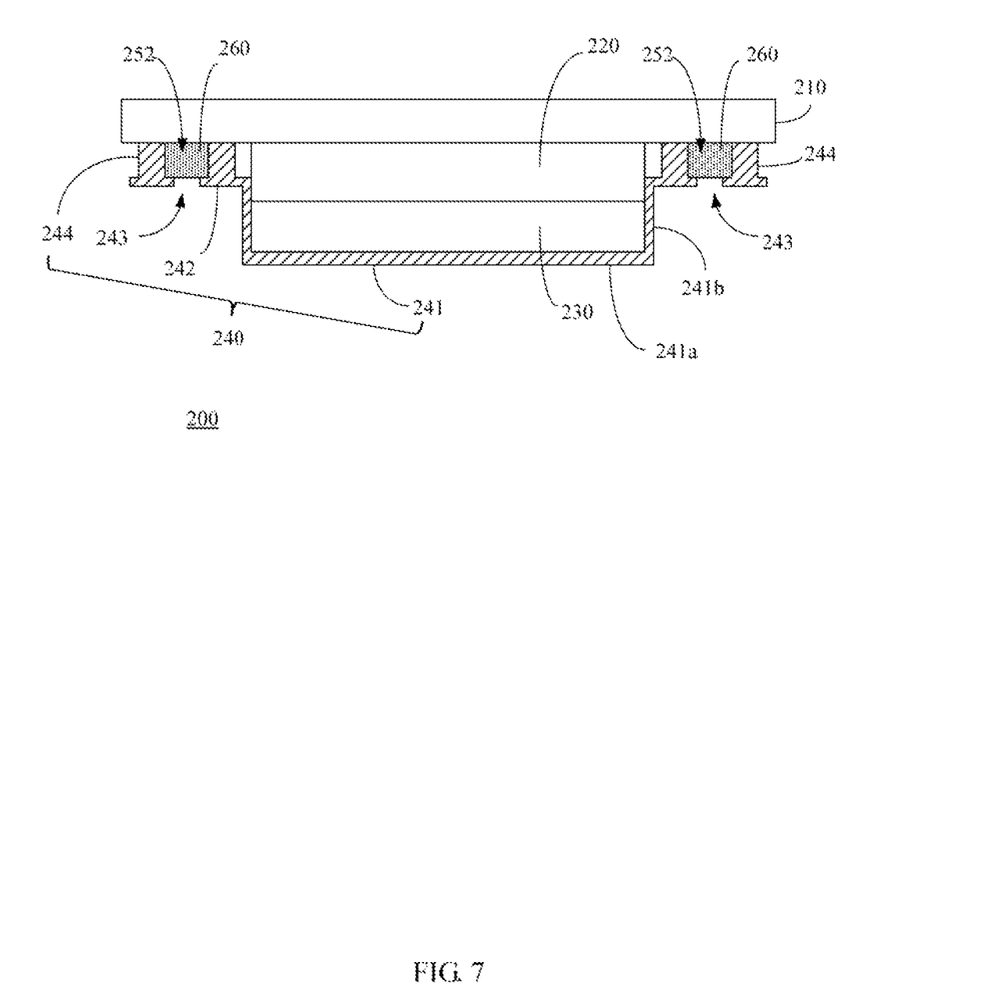
FIG. 7 is a cross-sectional view of the electronic device of FIG. 5, taken along line VII-VII.

Referring to FIGS. 6 and 7, the fixing structure 240 includes a receiving portion 241, a fixing portion 242, and a supporting portion 244. The receiving portion 241 includes a bottom plate 241a and four side walls 241b perpendicularly extending from four sides of the bottom plate 241a. The bottom plate 241a and four side walls 241b form a receiving area 241c to receive the touch module 220 and the display module 230. The fixing portion 242 is extended from the ends of the side walls 241b, parallel with the bottom plate 241a and away from the receiving portion 241. The supporting portion 244 is extended from the fixing portion 242 to the cover glass 210 and parallel with the side walls 241b.

The cover glass 210 is located above the supporting portion 244, the fixing portion 242, the touch module 220, and the display module 230 and is abutted on the supporting portion 244. The touch module 220 is located between the display module 230 and the cover glass 210.

A number of grooves 252 are defined in the supporting portion 244. A number of holes 243 are defined in the fixing portion 242 corresponding to the grooves 252. The structural adhesive 260 is injected in the grooves 252 via the holes 243 to adhere the fixing portion 242 with the cover glass 210 and increase a structural strength of the fixing structure 240. Preferably, the holes 243 are circular holes. A cross section area in a plane parallel to the cover glass 210 of each of the holes 243 is less than that of the corresponding groove 252.

The cover glass 210 protects the touch module 220, the display module 230, and other electronic elements in the electronic device 200. The touch module 220 is applied for detecting touch operations on the cover glass 210. The display module 230 is applied for displaying images. The fixing structure 240 is applied for fixing the cover glass 210, the touch module 220, and the display module 230. The structural adhesive 260 is applied for pasting the cover glass 210 on the fixing structure 240 and increasing a structural strength of the fixing structure 240.

In this embodiment, the cover glass 210 is made of glass. The touch module 220 is a capacitive touch panel. The display module 230 is a liquid crystal display including a display panel 231 and a backlight module 232. The fixing structure 240 is made of metal. The structural adhesive 260 is a DP-810 model or DP-4XL model structural adhesive made of 3M™ Company. It is understood that, in other embodiments, the cover glass 210 can be made of polymer. The touch module 220 can be a resistance type, an infrared type, or an acoustic wave type touch module. The display module 230 can be an OLED (Organic Light Emitting Diode) display panel. The fixing structure 240 can be made of plastics.

Figure 8:
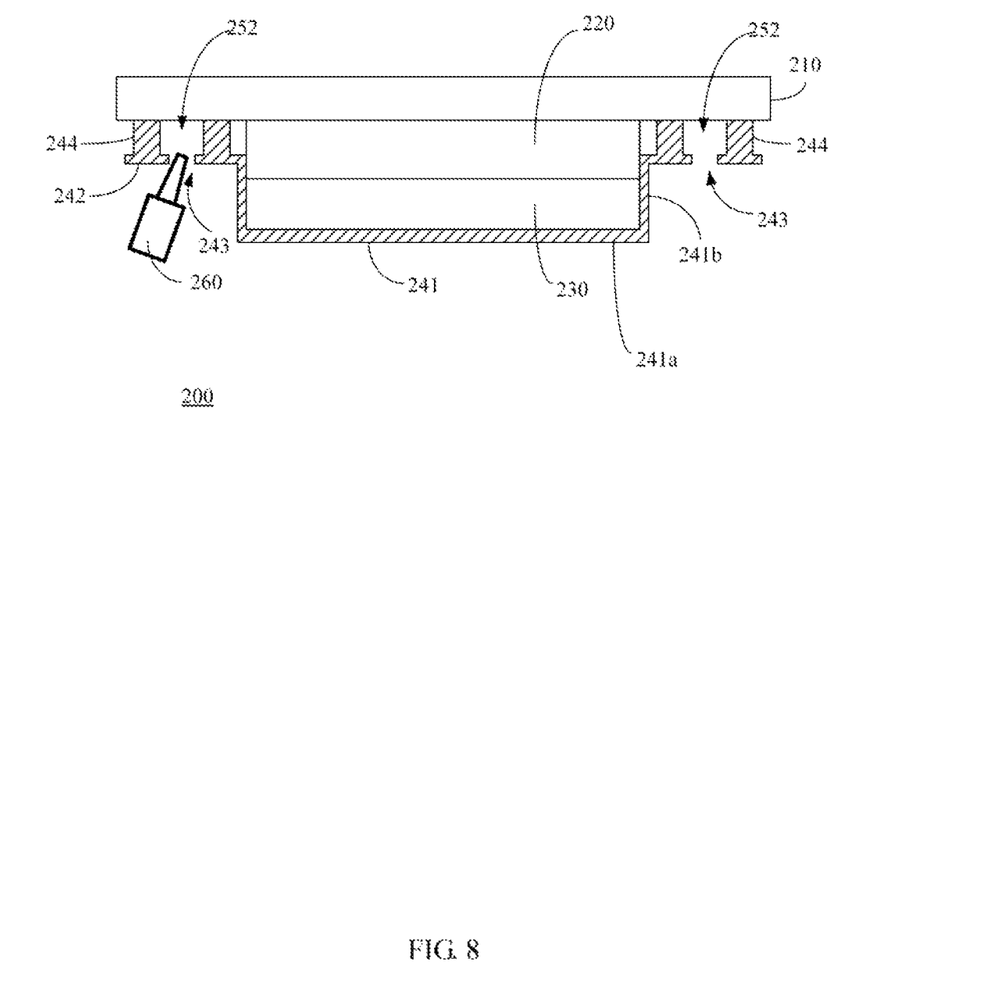
FIG. 8 is a schematic diagram while a structural adhesive is injecting in the electronic device in FIG. 5.

Referring to FIG. 8, when the electronic device 200 is packaging, the cover glass 210, the touch module 220, and the display module 230 are stuck together firstly, and then the fixing structure 240 is abutted on the cover glass 210. After the fixing structure 240 has been abutted on the cover glass 210, the structural adhesive 260 is injected in the grooves 252 via the holes 243. Then, all sides of the structural adhesive 260 are around and obstructed by the supporting portion 244, and thus without excessive adhesive phenomenon.

It is understood that, in an actual product of the electronic device 200, an amount of the structural adhesive 260 is controlled by adjusting a thickness and a height of the supporting portion 244 and a size of the groove 252. In this embodiment, the receiving portion 241, the fixing portion 242, and the supporting portion 244 of the fixing structure 240 are integrated molded. In other embodiment, the receiving portion 241, the fixing portion 242, and the supporting portion 244 of the fixing structure 240 are connected with each other by locking or adhering.

The embodiments shown and described above are only examples. Many details are often found in the art such as the other features of a touch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device, comprising:
   a fixing structure, the fixing structure comprising a receiving portion and a fixing portion attached to a periphery of the receiving portion and surrounding the receiving portion;
   a display module positioned in the receiving portion;
   a cover glass located above the fixing portion and the display module;
   a first adhesive located between the fixing portion and the cover glass to adhere the fixing portion with the cover glass, wherein a groove is defined in the first adhesive, a hole is defined in the fixing portion, the hole air communicating with the groove; and
   a second adhesive positioned in the groove to adhere the fixing portion with the cover glass.

2. The electronic device of claim 1, further comprising a touch module, wherein the touch module is located between the display module and the cover glass.

3. The electronic device of claim 1, wherein the receiving portion comprises a bottom plate and four side walls perpendicularly extending from the bottom plate, the bottom plate and the four side walls form a receiving area to receive the display module.

4. The electronic device of claim 3, wherein the fixing portion extends laterally from ends of the side walls to be parallel with the bottom plate and positioned away from the receiving portion.

5. The electronic device of claim 1, wherein a cross-sectional area of the hole in a plane parallel to the cover glass is less than a cross-sectional area of the corresponding groove connected to the hole in a plane parallel to the cover glass.

6. The electronic device of claim 1, wherein the hole is circular.

7. The electronic device of claim 1, wherein the second adhesive is a structural adhesive.

8. The electronic device of claim 1, wherein the display module comprises a display panel and a backlight.

9. The electronic device of claim 1, wherein the fixing structure is made of metal.

10. An electronic device, comprising:
   a cover glass;
   a fixing structure located below the cover glass comprising:
      a receiving portion;
      a fixing portion attached to a periphery of the receiving portion and surrounding the receiving portion; and
      a supporting portion extended from the fixing portion and abutted on the cover glass, wherein a groove is defined in the supporting portion, a hole is defined in the fixing portion, the hole air communicating with the groove;
   a display module received in the receiving portion; and
   an adhesive positioned in the groove to adhere the fixing portion with the cover glass.

11. The electronic device of claim 10, further comprising a touch module, wherein the touch module is located between the display module and the cover glass.

12. The electronic device of claim 10, wherein the receiving portion comprises a bottom plate and four side walls perpendicularly extending from the bottom plate, the bottom plate and the four side walls form a receiving area to receive the display module.

13. The electronic device of claim 12, wherein the fixing portion extends from ends of the side walls to be parallel with the bottom plate and positioned away from the receiving portion.

14. The electronic device of claim 13, wherein the supporting portion extends from the fixing portion to couple to the cover glass and to be parallel with the side walls.

15. The electronic device of claim 10, wherein a cross-sectional area in a plane parallel to the cover glass is less than a cross-sectional area of the corresponding groove connected to the hole in a plane parallel to the cover glass.

16. The electronic device of claim 10, wherein the hole is circular.

17. The electronic device of claim 10, wherein the adhesive is a structural adhesive.

18. The electronic device of claim 10, wherein the display module comprises a display panel and a backlight.

19. The electronic device of claim 10, wherein the fixing structure is made of metal.

* * * * *